United States Patent [19]

Torelli et al.

[11] 3,922,292
[45] Nov. 25, 1975

[54] NOVEL HAPTENE STEROIDS

[75] Inventors: Vesperto Torelli, Maisons-Alfort; Andre Pierdet, Noisy-le-Sec, both of France

[73] Assignee: Roussel-UCLAF, Paris, France

[22] Filed: June 17, 1974

[21] Appl. No.: 479,889

[30] Foreign Application Priority Data
June 18, 1973 France .............. 73.22114

[52] U.S. Cl. ... 260/397.1; 195/51 F; 260/239.55 R; 260/340.6; 260/340.9; 260/348 A; 260/397.4; 260/397.45; 260/397.5 A; 424/88
[51] Int. Cl.² ................................. C07J 1/00
[58] Field of Search .................. 260/397.1

[56] References Cited
UNITED STATES PATENTS
3,211,756  10/1965  Mazur .................. 260/397.1
FOREIGN PATENTS OR APPLICATIONS
3,822,877  10/1963  Japan ................. 260/397.1

Primary Examiner—Ethel G. Love
Attorney, Agent, or Firm—Hammond & Littell

[57] ABSTRACT
Novel steroids of the formula

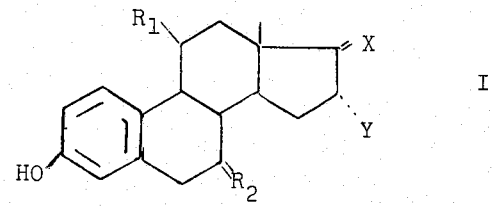

wherein X is selected from the group consisting of =O and,

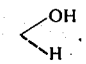

Y is selected from the group consisting of hydrogen and —OH and when $R_1$ is —$(CH_2)_a$—COOH in which a is equal to $2n + 3$ and n is 0, 1 or 2, $R_2$ is

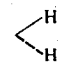

and when $R_1$ is hydrogen, $R_2$ is selected from the group consisting of

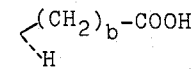

and =N—Z—$(CH_2)_c$—COOH, b is a number from 3 to 18, c is a number from 1 to 8 and Z is selected from the group consisting of —O— and —NHCONH— which are haptenes or compounds capable of producing antibodies in vitro but are derived of antigenic properties and their preparation.

9 Claims, No Drawings

NOVEL HAPTENE STEROIDS

STATE OF THE ART

C.R. Series C., vol. 276 (1973), p. 303 describes haptenes which are derived from $\Delta^5$-androstene-3β-ol-17-one but the compounds of the invention are derivatives of estrone, estradiol and estratriol.

OBJECTS OF THE INVENTION

It is an object of the invention to provide the novel $\Delta^{1,3,5(10)}$-estratrienes of formula I.

It is another object of the invention to provide novel processes for the preparation of the steroids of formula I.

It is a further object of the invention to provide novel antigens and a process for their preparation.

These and other objects and advantages of the invention will become obvious from the following detailed description.

THE INVENTION

The novel $\Delta^{1,3,5(10)}$-estratrienes of the invention have the formula

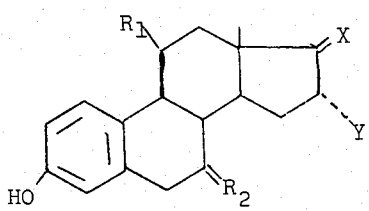   I wherein X is selected from the group consisting of =O and

Y is selected from the group consisting of hydrogen and —OH and when $R_1$ is —$(CH_2)_a$—COOH in which $a$ is equal to $2n + 3$ and $n$ is 0, 1 or 2, $R_2$ is

and when $R_1$ is hydrogen, $R_2$ is selected from the group consisting of

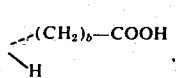

and =N—Z—$(CH_2)_c$—COOH, $b$ is a number from 3 to 18, $c$ is a number from 1 to 8 and Z is selected from the group consisting of —O— and —NHCONH—.

Among the preferred compounds of formula I are those where —$(CH_2)_a$—COOH are butyric acid, pentylic acid or hexylic acid, those where —$(CH_2)_b$—COOH is derived from an alkanoic acid of 4 to 12 carbon atoms such as butyric acid, isobutyric acid, pentylic acid, undecylic acid or dodecylic acid and those where —$(CH_2)_c$—COOH is derived from an aliphatic carboxylic acid of 2 to 5 carbon atoms such as acetic acid, propionic acid, butyric acid, isobutyric acid or pentylic acid.

Among the most preferred compounds of formula I are those where $R_2$ is

and $R_1$ is —$(CH_2)_a$—COOH where $a$ has the above definition. Examples of these specific haptenes are $\Delta^{1,3,5(10)}$-estratriene-3,17β-diol-11β-butyric acid and $\Delta^{1,3,5(10)}$-estratriene-3-ol-17-one-11β-butyric acid.

Another preferred group of haptenes of formula I are those where $R_1$ is hydrogen and $R_2$ is

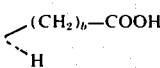

where $b$ has the above definition. Specific compounds of this group are $\Delta^{1,3,5(10)}$-estratriene-3,17β-diol-7α-butyric acid, $\Delta^{1,3,5(10)}$-estratriene-3-ol-17-one-7α-butyric acid, $\Delta^{1,3,5(10)}$-estratriene-3,16α,17β-triol-7α-butyric acid and $\Delta^{1,3,5(10)}$-estratriene-3,17β-diol-7α-undecanoic acid.

A third preferred group of compounds of formula I are those where $R_1$ is hydrogen and $R_2$ is =N—Z—$(CH_2)_c$—COOH and $c$ and Z has the above definitions. Examples of these compounds are 7-carboxymethoxyimino-$\Delta^{1,3,5(10)}$-estratriene-3,17β-diol, 7-carboxymethoxyimino-$\Delta^{1,3,5(10)}$-estratriene-3-ol-17-one and 4'-carboxymethyl-2'-semicarbazone of $\Delta^{1,3,5(10)}$-estratriene-3,17β-diol-7-one.

The novel process of the invention for the preparation of the compounds of formula I in which $R_1$ is —$(CH_2)_a$—COOH and $R_2$ is

comprises reacting a compound of the formula

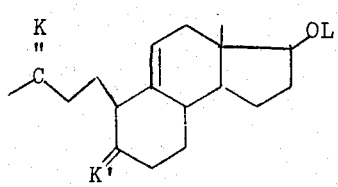   II (prepared as in French Pat. No. 1,497,593) wherein K and K' are blocked keto in the form of a ketal and L is acyl of an organic carboxylic acid with an epoxidation agent followed by reaction with a saponification agent to form a compound of the formula

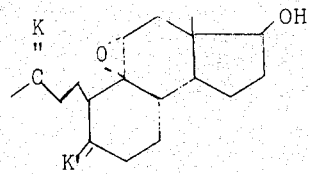    III reacting the latter with an allyl magnesium halide to form a compound of the formula

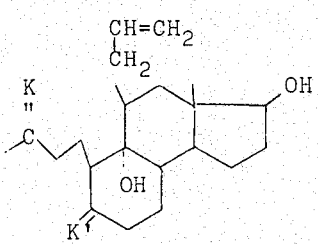    IV reacting the latter with a deketalization agent and then a cyclization agent to obtain a compound of the formula

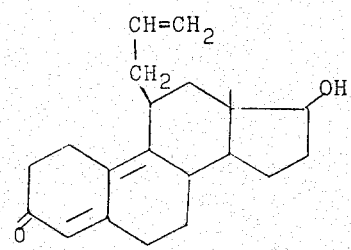    V reacting the latter with an aromatization agent to form compound of the formula

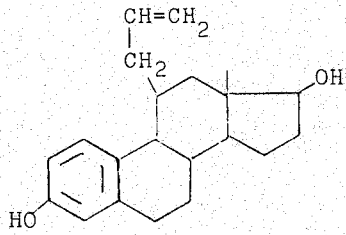    VI reacting the latter with an acylating agent to form a compound of the formula

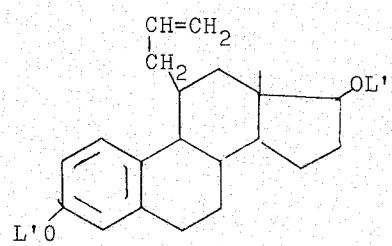    VII wherein L' is an acyl of an organic carboxylic acid, subjecting the latter to ozonolysis to form a compound of the formula

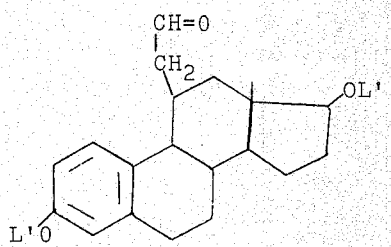    VIII reacting the latter with an alkyl dialkylphosphonoacylate of the formula

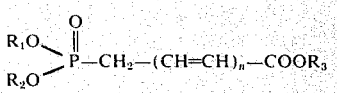

wherein $R_1$, $R_2$ and $R_3$ are the same or different alkyls of 1 to 8 carbon atoms and $n$ has the above definition followed by reaction with a saponification agent to obtain a compound of the formula

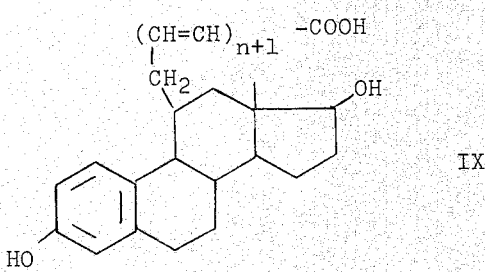    IX and reacting the latter with a hydrogenation agent to obtain the compound of formula I wherein $R_1$ is $-(CH_2)_a-COOH$, $a$ is equal to $2n + 3$, X is

Y is hydrogen and $R_2$ is

The said product may be oxidized with an oxidation agent to form the corresponding compound of formula I wherein X is =O.

The substituents K and K' may be the same or different and are preferably cyclic alkylene ketals of 2 to 4 carbon atoms such as ethylene ketal or propyleneketal or dialkylketals such as dimethylketal or diethylketal.

L is preferably derived from a saturated or unsaturated aliphatic or cycloaliphatic carboxylic acid of 1 to 18 carbon atoms. Examples of suitable acids are alkanoic acids such as formic acid, acetic acid, butyric acid, propionic acid, isobutyric acid or undecylic acid; cycloalkylcarboxylic acids and cycloalkylalkanoic acids such as cyclopropylcarboxylic acid, cyclopentylcarboxylic acid, cyclohexylcarboxylic acid, cyclopentylacetic acid, cyclopentylpropionic acid, cyclohexylacetic acid or cyclohexylpropionic acids; benzoic acid; phenylalkanoic acids such as phenylacetic acid or phenylpropionic acid; or amino acids such as diethylaminoacetic acid or aspartic acid.

The epoxidation agent is preferably a peracid such as peracetic acid, perphthalic acid or m-chloroperbenzoic acid and the saponification agent is preferably an alkali metal base such as sodium hydroxide, potassium hydroxide, sodium amide, potassium tert.-butylate or lithium acetylide in ethylenediamine and the saponification reaction is preferably effected in a lower alkanol such as methanol or ethanol. The allyl magnesium halide is preferably the chloride or bromide.

The deketalization agent is preferably an acid agent such as hydrochloric acid, sulfuric acid, acetic acid, citric acid or p-toluene sulfonic acid and the reaction is preferably effected in at least one organic solvent such as alkanols like methanol, ethanol or isopropanol, a ketone such as acetone or a hydrocarbon such as benzene or toluene.

The cyclization agent may be a basic or acidic agent but is preferably basic such as an alkali metal alcoholate like sodium methylate, sodium ethylate or sodium or potassium tert.-butylate. The aromatization agent is preferably an acyl halide such as acetylhalide, preferably acetyl bromide, or acetic acid anhydride and the said reaction is followed by saponification with one of the agents discussed above. The esterification is preferably effected with the acid or a functional derivative thereof such as the acid halide, i.e. chloride or bromide, or its anhydride. L' is preferably the same as L.

The ozonolysis is effected with ozone at temperatures of −50° to −100°C and the alkyl dialkylphosphonoacylate has the formula

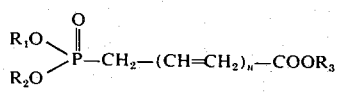

where preferably $R_1$ and $R_2$ are the same and are alkyl of 1 to 6 carbon atoms and $R_3$ is alkyl of 1 to 6 carbon atoms.

The saponification agent is preferably an alkali metal base such as sodium hydroxide or potassium hydroxide, sodium amide, potassium tert.-butylate or lithium acetylide in ethylenediamine. The hydrogenation agent is preferably hydrogen in the presence of a catalyst such as palladium. The oxidation agent is preferably chromic anhydride, silver carbonate, silver silicate or lead tetraacetate.

In the most preferred mode of the invention, the epoxidation agent is perphthalic acid, the allyl magnesium halide is the bromide, the deketalization agent is sulfuric acid, the cyclization agent is sodium hydroxide, the aromatization agent is acetic acid anhydride, the saponification agent after aromatization is sodium hydroxide, the esterification agent is benzoyl chloride, the alkyl dialkylphosphonoacylate is methyl diethylphosphonoacetate, the hydrogenation agent is hydrogen in the presence of palladized carbon, the last saponification agent is potassium hydroxide and the oxidation agent is chromic anhydride.

The process of the invention for the preparation of compounds of formula I wherein $R_1$ is hydrogen and $R_2$ is

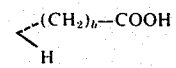

and $b$ has the above definition comprises reacting a steroid of the formula

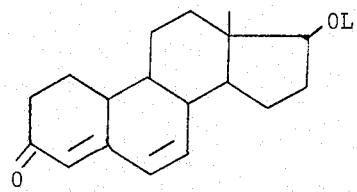

where L is acyl of an organic carboxylic acid (prepared as in French Pat. No. 1,180,907) with a compound of the formula

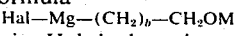

wherein Hal is bromine or chlorine and OM is a blocked hydroxy in ether form followed by reaction with an acid agent and then an acid of the formula AcOH where Ac is acyl of an organic carboxylic acid or a functional derivative thereof to obtain a compound of the formula

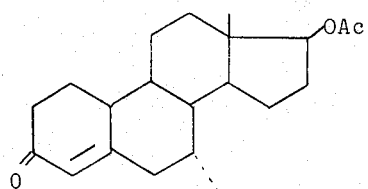

reacting the latter with a saponification agent to obtain a compound of the formula

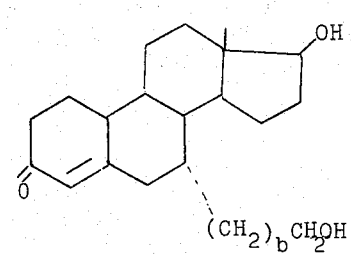

reacting the latter with an oxidation agent to form a compound of the formula

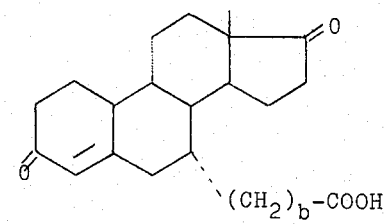

and reacting the latter with a dehydrogenation agent to form a compound of the formula

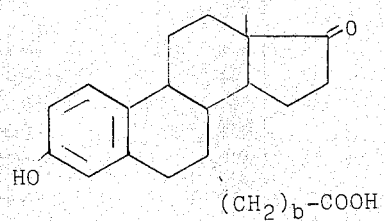

XVI which is a compound of formula I wherein $R_1$ is hydrogen, X is =O, Y is hydrogen and $R_2$ is

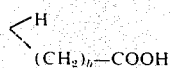

and b is 3 to 18. The latter compound may be reacted with a reducing agent to form the corresponding compound of formula I wherein X is

or may be reacted with an alcohol of the formula TOH where T is lower alkyl or a functional derivative thereof to form a compound of the formula

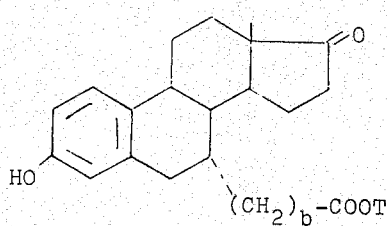

XVII reacting the latter with an acid of the formula VOH where V is acyl of an organic carboxylic acid or a functional derivative thereof to form a compound of the formula

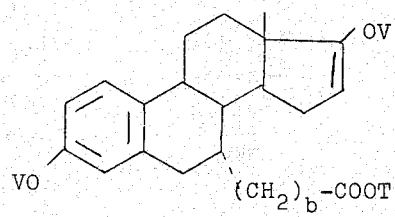

XVIII reacting the latter with an epoxidation agent to form a compound of the formula

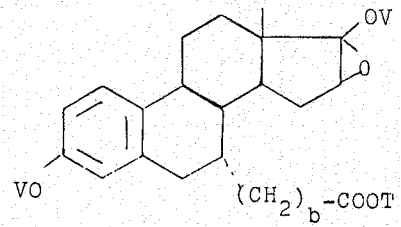

XIX subjecting the latter to hydroylsis to form a compound of the formula

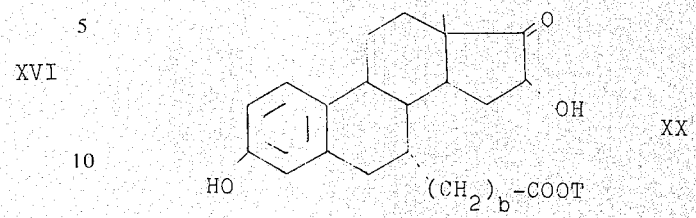

XX and reacting the latter with a reducing agent then with a saponification agent to form a compound of formula I where $R_1$ is hydrogen, X is

Y is OH, $R_2$ is

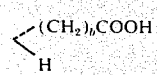

and b is 3 to 18.

L has the same preferred values indicated above and Hal is chlorine or bromine and M is preferably benzyl or tetrahydropyranyl. The acid agent is preferably hydrochloric acid, sulfuric acid, citric acid, acetic acid or p-toluene sulfonic acid and the esterification agent is the acid AcOH or a functional derivative thereof and Ac has preferably the same values as L above.

The saponification agent is preferably one of those discussed above such as sodium hydroxide, potassium hydroxide, sodium amide, potassium tert.-butylate or lithium acetylide in ethylenediamine and the reaction is effected in a lower alkanol such as methanol or ethanol. The oxidation agent may be one of those previously mentioned such as chromic anhydride and the dehydrogenation is preferably effected biochemically, such as with Arthrobacter Simplex UC 1047. The reducing agent is preferably hydrogen in the presence of a palladium catalyst.

The esterification agent for the compound of formula XVI is preferably the alcohol, TOH where T is alkyl of 1 to 8 carbon atoms. The agent to esterify the 3-hydroxy and the enolic form of the 17-keto group is preferably an acid anhydride such as acetic anhydride or a derivative of the formula

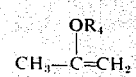

wherein $R_4$ is acyl of an organic carboxylic acid of 1 to 8, preferably 1 to 4 carbon atoms. The epoxidation agent is preferably a peracid such as perchloric acid, perphthalic acid or hexafluoroacetone hydroperoxide. The hydrolysis is effected in an acid media such as sulfuric acid or acetic acid and the reducing agent is preferably a mixed hydride such as sodium or lithium borohydride. The saponification agent may be one of those discussed above.

In the most preferred mode of this process, L is acetyl, Hal is chlorine, and M is tetrahydropyranyl. The acid agent is hydrochloric acid, the esterification agent is acetic anhydride, the saponification agent is methanolic potassium hydroxide, the reducing agent is sodium borohydride, the esterification agent of the acid function is ethanol, the esterification agent of 3-hydroxy and of the enolic form of the 17-keto group is isopropenyl acetate, the epoxidation agent is hexafluoroacetone hydroperoxide, the hydrolysis reaction is effected in a sulfuric acid medium, the reducing agent is sodium borohydride and the last saponification agent is methanolic potassium hydroxide.

The process of the invention for the preparation of compounds of formula I wherein $R_1$ is hydrogen and $R_2$ is $=N-Z-(CH_2)_c-COOH$ wherein Z and c have the above definitions comprises reacting a compound of the formula

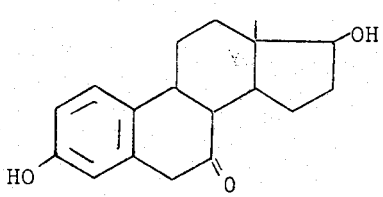

with a compound of the formula
$H_2NZ-(CH_2)_c-COOH$
to form the corresponding compound of formula

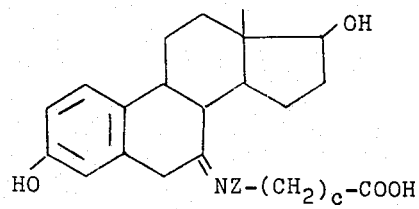

which is a compound of formula I wherein $R_1$ is hydrogen, X is

Y is hydrogen, $R_2$ is $=NZ-(CH_2)_cCOOH$, Z is selected from the group consisting of $-O-$ and $-NHCONH-$, and C is a number from 1 to 8.
which can then be reacted with an oxidizing agent to a compound of the formula

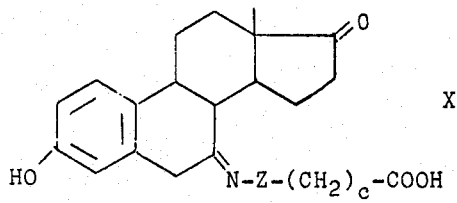

which is a compound of formula I wherein $R_1$ is hydrogen, X is oxygen, Y is hydrogen, $R_2$ is $= NZ - (CH_2)_cCOOH$, Z is selected from the group consisting of $-O-$ and $-NHCONH-$, and C is a number from 1 to 8.

In a preferred mode of the invention, the compound of the formula $H_2-NZ-(CH_2)_c-COOH$ is used in the form of its acid addition salt such as its hydrochloride and the oxidation agent may be chromic anhydride. The 7-keto estradiol of formula XXI is described in U.S. Pat. No. 2,418,603.

The compounds of formula I are haptenes useful for the preparation of antigens by forming a mixed acid anhydride thereof with an lower alkyl haloformate, particularly isobutyl chloroformate and reacting the resulting mixed anhydride with beef serum albumin. From these antigens, antibodies may be prepared by known methods such as described by Erlanger [J. Biol. Chem., Vol. 228, p. 713].

The antibodies obtained are specific for the starting steriods which are estrone, estradiol and estriol which is evidenced by classical methods, particularly dialysis to equilibrium. This specificity of the antibodies obtained makes them usable as agents at the dosage used for estrone, estradiol or estriol. They are of interest for the dosing power for regulating the level of estriol in the blood and urine of pregnant women to permit the detection of certain anomalies of the fetus.

In the following examples there are described several preferred embodiments to illustrate the invention. However, it should be understood that the invention is not intended to be limited to the specific embodiments.

EXAMPLE 1

$\Delta^{1,3,5(10)}$-estratriene-3,17$\beta$-diol-11$\beta$-butyric acid

STEP A: Bis 3,3 5,5-ethylenedioxy-9$\alpha$,11$\alpha$-epoxy-4,5-secoestrane-17$\beta$-ol 22 g of monoperphthalic acid were added at 20°C with stirring to a mixture of 21.9 g of the benzoate of bis-3,3 5,5-ethylenedioxy-4,5-seco-$\Delta^{9(11)}$-estrene-17$\beta$-ol (prepared as described in French Pat. No. 1,497,593) in 220 ml of tetrahydrofuran and the mixture was allowed to stand for about 16 hours. Then, the mixture was poured into a saturated sodium bicarbonate solution and the mixture was vacuum filtered. The precipitate was washed to obtain 22.2 g of a product melting at 160°C which was used as is. 31.98 g of the said product were added to 130 ml of methanol and the suspension was added to 130 ml of 1.74 N methanolic potassium hydroxide. The mixture was refluxed for 1 hour, was cooled, diluted with water and was extracted with methylene chloride. The extracts were dried and evaporated to dryness to obtain 23.6 g of resin which was crystallized from isopropyl ether to obtain 22.3 g of bis 3,3 5,5 -ethylenedioxy-9$\alpha$, 11$\alpha$-epoxy-4,5-seco-estrane-17$\beta$-ol melting at 148°C.

STEP B: Bis 3,3 5,5-ethylenedioxy-11$\beta$-allyl-4,5-seco-estrane-9$\alpha$, 17$\beta$-diol 32.4 g of bis 3,3 5,5-ethylenedioxy-9$\alpha$, 11$\alpha$-epoxy-4,5-seco-estrane-17$\beta$-ol were added with stirring under a nitrogen atmosphere to 1105 ml of a 0.65 M solution of allyl magnesium bromide in tetrahydrofuran and the solution was heated to 60°C for 4½ hours. The mixture was cooled and stood overnight at room temperature under a nitrogen atmosphere. After cooling the mixture to 0°C, 45 ml of methanol and 100 ml of ether were added thereto slowly and then 5 ml of water were added. The reaction mixture was poured into 1000 ml of a saturated ammonium chloride solution and the aqueous phase was decanted and extracted with ether. The extracts were dried and distilled to dryness under reduced pressure to obtain 45 g of a crystalline product which was empasted with a mixture of ether and essence B (B.p = 60°–68°C). The mixture was vacuum filtered and the product was washed with essence B to obtain 34 g of bis 3,3 5,5-ethylenedioxy-11$\beta$-allyl-4,5-seco-estrane-9$\alpha$, 17$\beta$-diol melting at 140°C.

STEP C: 11$\beta$-allyl-$\Delta^{4,9}$-estradiene-17$\beta$-ol-3-one 34 g of bis 3,3 5,5-ethylenedioxy-11$\beta$-allyl-4,5-secoestrane-9$\alpha$, 17$\beta$-diol were added with stirring to a mixture of 340 ml of acetone and 68 ml of N sulfuric acid and the mixture was stirred for 4 hours at room temperature. Then 500 ml of water were added and the mixture was extracted with methylene chloride to obtain 38 g of a product which was used as is. Nitrogen was bubbled through the 38 g of product in 760 ml of anhydrous methanol with stirring and the solution was cooled while bubbling nitrogen therethrough. 85 g of potassium hydroxide were added at a temperature below 20°C and the mixture was allowed to stand 4 hours at room temperature while bubbling nitrogen therethrough. 100 ml of acetic acid were added thereto and the mixture was diluted with water and extracted with methylene chloride to obtain 25 g of product which was chromatographed to obtain 11$\beta$-allyl-$\Delta^{4,9}$-estradiene-17$\beta$-ol-3-one.

| U.V. Spectrum (ethanol): | |
|---|---|
| Max. at 215 nm | $E_{1cm}^{1\%} = 171$ |
| Max. at 238 nm | $E_{1cm}^{1\%} = 157$ |
| Inflexion towards 248 nm | $E_{1cm}^{1\%} = 148$ |
| Max. at 305 nm | $E_{1cm}^{1\%} = 491 \quad \epsilon = 15,300$ |

STEP D: 11$\beta$-allyl-$\Delta^{1,3,5(10)}$-estratriene-3,17$\beta$-diol 25 g of 11$\beta$-allyl-$\Delta^{4,9}$-estradiene-17$\beta$-ol-3-one were added with stirring under a nitrogen atmosphere to 125 ml of acetic acid anhydride and the solution was heated to 100°C for 2 hours and was then cooled. 62.5 ml of acetyl bromide were added dropwise at a temperature below 10°C and the mixture was allowed to stand for 2 hours at 20°C and was then poured into ice. The mixture was extracted with methylene chloride and the extracts were washed with water, dried and distilled to dryness to obtain 36 g of a product which was chromatographed over silica to obtain 27 g of a resin used as.

The 27 g of resin were dissolved at 25°C under a nitrogen atmosphere in 540 ml of methanol and 27 ml of sodium carbonate were added thereto. The mixture stood at room temperature for 4 hours and then 16 ml of acetic acid and 2.5 liters of water were added thereto. The mixture was vacuum filtered and the precipitate was washed to obtain 19.65 g of product melting at 195°C. The product was empasted at reflux with dichloroethane to obtain 11$\beta$-allyl-$\Delta^{1,3,5(10)}$-estratriene-3,17$\beta$-diol melting at 200°C.

STEP E: 3,7-dibenzoate of 11$\beta$-allyl-$\Delta^{1,3,5(10)}$-estratriene-3,17$\beta$-diol 9.3 ml of benzoyl chloride were added to a stirred mixture of 9.286 g of 11$\beta$-allyl-$\Delta^{1,3,5(10)}$-estratriene-3,17$\beta$-diol in 93 ml of anhydrous pyridine and the mixture was allowed to stand for 4 hours at room temperature. Water was then added to obtain a final volume of dilution of 250 ml and the mixture was vacuum filtered. The precipitate was washed with water and dried to obtain 12.6 g of the 3,17-dibenzoate of 11$\beta$-allyl-$\Delta^{1,3,5(10)}$-estratriene-3,17$\beta$-diol melting at 198°C.

STEP F: 3,17-dibenzoate of 11$\beta$-[2'-oxoethyl]-$\Delta^{1,3,5(10)}$-estratriene-3,17$\beta$-diol 12.3 g of the 3,17-dibenzoate of 11$\beta$-allyl-$\Delta^{1,3,5(10)}$-estratriene-3,17$\beta$-diol were added with stirring under a nitrogen atmosphere to 370 ml of methylene chloride and after cooling the solution to −65°C, ozonized oxygen was bubbled therethrough at a rate of 0.2–0.3 liters per minute for 1½ hours. Then, 25 g of powdered zinc and 50 ml of acetic acid were added and the temperature was allowed to return to room temperature. The mixture was stirred for 30 minutes and the zinc was filtered off. The filtrate was washed, dried and distilled to dryness to obtain 12.89 g of resin which was chromatographed over silica gel to obtain 11.15 g of the 3,17-dibenzoate of 11$\beta$-[2'-oxoethyl]-$\Delta^{1,3,5(10)}$-estratriene-3,17$\beta$-diol melting at 148°C.

STEP G: $\Delta^{1,3,5(10)}$-estratriene-3, 17$\beta$-diol-11$\beta$-crotonic acid 1.2 g of a 50% dispersion of sodium hydride in an oil were added with stirring under a nitrogen atmosphere to 20 ml of anhydrous tetrahydrofuran and after cooling the mixture to 15°C, 5 ml of methyl diethylphosphonoacetate were added dropwise at a temperature below 20°C. The mixture stood for a half hour and then 1.305 g of 3,17-dibenzoate of 11$\beta$-[2'oxoethyl]-$\Delta^{1,3,5(10)}$-estratriene-3, 17$\beta$-diol in 20 ml of tetrahydrofuran was added dropwise. The mixture was stirred at room temperature for 40 minutes and water was added. The mixture was extracted with ethylacetate and the extracts were washed with water, dried and distilled under reduced pressure to obtain 2.23 g of resin. The 2.23 g of resin were added to 20 ml of N sodium hydroxide and 10 ml of ethanol and the mixture was refluxed for 1½ hours and then cooled. The mixture was extracted with chloroform and then ethylacetate. The organic phases were washed and dried and empasted with ether. The mixture was vacuum filtered and the crystals were washed to obtain 830 mg of $\Delta^{1,3,5(10)}$-estratriene-3, 17$\beta$-diol-11$\beta$-crotonic acid melting at 272°C.

STEP H: $\Delta^{1,3,5(10)}$-estratriene-3,17$\beta$-diol-11$\beta$-butyric acid 150 mg of 10% palladized carbon black were added to a solution of 726 mg of $\Delta^{1,3,5(10)}$-estratriene-3, 17$\beta$-diol-11$\beta$-crotonic acid in 30 ml of methanol and 2 ml of chloroform and the mixture was stirred with hydrogen until saturation was reached. The catalyst was filtered off and the filtrate was evaporated to obtain 750 mg of resin. The said resin was dissolved in 7.5 ml of methanol and 0.75 cm of potassium hydroxide and the solution was refluxed, acidified, diluted with water and extracted with ethyl acetate. The extract was washed with water, dried and distilled to dryness under reduced pressure to obtain 674 mg of crystalline product which was crystallized to obtain 604 mg of $\Delta^{1,3,5(10)}$-estratriene-3, 17β-diol-11β-butyric acid melting at 262°c.

EXAMPLE 2

$\Delta^{1,3,5(10)}$-estratriene-3-ol-17-one-11β-butyric acid

A suspension of 2.1 g of $\Delta^{1,3,5(10)}$-estratriene-3, 17β-diol-11β-butyric acid in 100 ml of acetone was cooled to 0°C and 25 ml of a solution of 8 N chromic anhydride in dilute sulfuric acid were added. 400 ml of water were then added over 30 minutes and the mixture was vacuum filtered. The crystalline product was washed with water to obtain 1.386 g of a product melting at 240°C. The mother liquors were extracted with ethyl acetate to obtain 0.580 g of a product melting at 240°C and the two crops were crystallized from isopropanol to obtain 770 g of $\Delta^{1,3,5(10)}$-estratriene-3-ol-17-one-11β-butyric acid melting at 256°C.

EXAMPLE 3

$\Delta^{1,3,5(10)}$-estratriene-3-ol-17-one-7α-butyric acid

STEP A: 7α-[4'-acetoxybutyl]-17β-acetoxy-$\Delta^4$-estrene-3-one 2.6 g of cuprous chloride were added to 575 ml of a solution of 0.62 M magnesium in 4-chlorobutanol, tetrahydropyranyl ether in tetrahydrofuran cooled to −30°C under a nitrogen atmosphere and after stirring for 20 minutes, a solution of 95 g of the acetate of 6-dehydro-19-nor-testosterone in 300 ml of tetrahydrofuran was added over 70 minutes. The solution was held for 1 hour at −30°C and then 40 ml of acetic acid and 300 ml of water were added. The mixture was extracted with ether and the organic phase was washed with water, dried and evaporated to dryness under reduced pressure to obtain 174 g of an oil which was added to 350 ml of methanol and 88 ml of 0.5 N hydrochloric acid. The mixture was refluxed for 2 hours, cooled and diluted with water. The mixture was extracted with methylene chloride and the organic phase was washed, dried and distilled to dryness under reduced pressure to obtain 122 g of resin which was chromatographed. The product was subjected overnight at room temperature to the action of 2 volumes of acetic acid anhydride and 2 volumes of pyridine and the mixture was concentrated to dryness to obtain 7α-[-4'-acetoxybutyl]-17β-acetoxy-$\Delta^4$-estrene-3-one melting at 113°C.

STEP B: 7α-[4'-hydroxybutyl]-$\Delta^4$-estrene-17β-ol-3-one 12 ml of 2 N methanolic potassium hydroxide were added under a nitrogen atmosphere to a solution of 5 g of the product of Step A in 10 ml of methanol and the mixture was neutralized with acetic acid in about 30 minutes and was diluted with water. The mixture was extracted with methylene chloride to obtain 4.3 g of 7α-[4'-hydroxybutyl]-$\Delta^4$-estrene-17β-ol-3-one which was used as is for the next step.

STEP C: $\Delta^4$-estrene-3,17-dione-7α-butyric acid

A solution of 10 ml of 8 N chromic anhydride in dilute sulfuric acid was added with stirring at 0°C to a solution of the product of Step B in 250 ml of acetone and the mixture was stirred for one-half hour. Methanol and water were added to the mixture and the acetone was removed by distillation under reduced pressure. The mixture was iced, vacuum filtered and the precipitate was washed with water and dried to obtain 3.9 g of $\Delta^4$-estrene-3,17-dione-7α-butyric acid melting at 250°C after crystallization from ethanol at 95°C.

STEP D: $\Delta^{1,3,5(10)}$-estratriene-3-ol-17-one-7α-butyric acid

A solution of 19 g of monopotassium phosphate in 1450 ml of distilled water were added with stirring and air introduction to 3 g of hyflosurpercel in 1500 of a solution buffered to a pH of 7 by addition of N sodium hydroxide and sufficient distilled water was added to obtain a volume of 2800 ml. 3 g of $\Delta^4$-estrene-3,17-dione-7α-butyric acid were added thereto followed by 30 mg of menadione, 35 ml of methanol and 30 g of Arthrobacter acetonic powder. The suspension was held at 34°C for 112 hours while adding over 65 hours 15 g of acetonic powder and 15 ml of methanol and over 96 hours 15 g of acetonic powder. At 112 hours, the pH of the solution was adjusted to 14 by addition of concentrated sodium hydroxide and 500 ml of ethyl acetate were added. The mixture was filtered and the filtrate was acidified with concentrated hydrochloric acid and saturated with ammonium sulfate. The aqueous phase was decanted and extracted with ethyl acetate. The extracts were washed, dried and concentrated to dryness and the insoluble fraction was washed with methanol and water. The filtrate was adjusted to a pH of 1 by addition of concentrated hydrochloric acid and was evaporated to dryness. The 2 dry extracts were purified by chromatography to obtain 1.92 g of $\Delta^{1,3,5(10)}$-estratriene-3-ol-17-one-7α-butyric acid melting at 206°C after crystallization from aqueous acetic acid.

IR Spectrum (chloroform): 17-Ketone C=O at $1773^{cm-1}$, acid at $1710^{cm-1}$, free OH at $1710^{cm-1}$ and aromatic at 1613, 1589 and $1499^{cm-1}$.

EXAMPLE 4

$\Delta^{1,3,5(10)}$-estratriene-3,17β-diol-7α-butyric acid 100 mg of sodium borohydride were added with cooling and stirring to 900 mg of $\Delta^{1,3,5(10)}$-estratriene-3-ol-17-one-7α-butyric acid in 6 ml of 0.5 N sodium hydroxide and 1 ml of methanol under a nitrogen atmosphere and another 100 mg of sodium borohydride were added after 1 hour. The mixture was stirred for 30 minutes and 4 ml of 2 N hydrochloric acid were added. The mixture was diluted, extracted and washed. The extracts were dried and evaporated to dryness under reduced pressure and the residue was chromatographed to obtain 816 mg of $\Delta^{1,3,5(10)}$-estratriene-3,17β-diol-7α-butyric acid in the form of an amorphous product.

IR Spectrum: C=O at $1706^{cm-1}$ and aromatic at 1610, 1584 and $1503^{cm-1}$.

EXAMPLE 5

$\Delta^{1,3,5(10)}$-estratriene-3,16α,17β-triol-7α-butyric acid

STEP A: Ethyl $\Delta^{1,3,5(10)}$-estratriene-3-ol-17-one-7α-butyrate

Gaseous hydrochloric acid was bubbled through 100 ml of $\Delta^{1,3,5(10)}$-estratriene-3-ol-17-one-7α-butyric acid in 3 ml of ethanol until saturation was reached and the mixture was refluxed for 1 hour. The mixture was distilled to dryness under reduced pressure and the residue was taken up in ethyl acetate. The solution was washed, dried and evaporated to dryness and the resulting resin was chromatographed to obtain 81 mg of ethyl $\Delta^{1,3,5(10)}$-estratriene-3-ol-17-one-7α-butyrate in the form of an amorphous product.

STEP B: Ethyl 3,17-diacetoxy-$\Delta^{1,3,5(10),16}$-estratetraene-7α-butyrate 150 mg of p-toluene sulfonic acid monohydrate were added to a solution of 1.41 g of ethyl $\Delta^{1,3,5(10)}$-estratriene-3-ol-17-one-7α-butyrate in 30 ml of redistilled isopropenyl acetate and the mixture was refluxed and distilled for 8 hours while maintaining constant volume by addition of isopropenyl acetate. The reaction mixture was cooled to room temperature and a solution saturated with sodium bicarbonate was added thereto. The mixture was extracted with methylene chloride and the extracts were washed, dried and evaporated to dryness to obtain 1.1 g of ethyl 3,17β-diacetoxy-$\Delta^{1,3,5(10),16}$-estratetraene-7α-butyrate which was used as in for the next step.

STEP C: Ethyl 3,17β-diacetoxy-16α,17α-epoxy-$\Delta^{1,3,5(10)}$-estratriene-7α-butyrate A drop of pyridine was added to a solution of 936 mg of the ethyl product of Step B in 10 ml of methylene chloride and after placing the mixture on an ice bath, 2.5 ml of methylene chloride solution of 1.2 M of hexafluoroacetone hydroperoxide were added over 15 minutes. The temperature was raised to room temperature and the mixture was stirred under a nitrogen atmosphere for 2½ hours. The mixture was extracted with methylene chloride and the organic phase was washed, dried and concentrated to dryness to obtain 1 g of ethyl 3,17β-diacetoxy-16α,17α-epoxy-$\Delta^{1,3,5(10)}$-estratriene-7α-butyrate which was used as is in the next step.

STEP D: Methyl $\Delta^{1,3,5(10)}$-estratriene-3,16α-diol-17-one-7α-butyrate 1 ml of 6 N sulfuric acid was added to a solution of 1 g of the ester of Step C in 10 ml of methanol and the mixture was stirred for 30 minutes at room temperature and then refluxed for 2 hours. The mixture was cooled to room temperature and was diluted with water and extracted with ethyl acetate. The extracts were washed, dried and evaporated to dryness to obtain 882 mg of methyl $\Delta^{1,3,5(10)}$-estratriene-3, 16α-diol-17-one-7α-butyrate which was used as is for the next step.

STEP E: $\Delta^{1,3,5(10)}$-estratriene-3,16α,17β-triol-7α-butyric acid 900 mg of sodium borohydride were added under a nitrogen atmosphere to a solution of 882 mg of the product of Step D in 10 ml of methanol and then 450 mg of sodium borohydride were added over 1¼ hours. The mixture was maintained at room temperature for 1 hour and then 1 ml of distilled water and 1 ml of potassium hydroxide were added thereto. The mixture was refluxed for 15 minutes, cooled to room temperature and diluted with water. The mixture was acidified with concentrated hydrochloric acid and extracted with ethyl acetate. The extracts were washed, dried and concentrated to dryness to obtain 795 mg of resin which was purified by chromatography to obtain 575 mg of $\Delta^{1,3,5(10)}$-estratriene-3,16α,17β-triol-7α-butyric acid melting at 160°–170°C and having a specific rotation $[\alpha]_D^{20} = +42°$ (c=1% in ethanol).

EXAMPLE 6

$\Delta^{1,3,5(10)}$-estratriene-3,17β-diol-7α-undecanoic acid

STEP A: 17β-acetoxy-7α-(11-acetoxyundecanyl)-$\Delta^4$-estrene-3-one

A solution of 65 g of the tetrahydropyranyl ether of 11-bromo-undecanol in 200 ml of tetrahydrofuran was added to 5g of magnesium turnings in 40 ml of tetrahydrofuran to obtain an 0.4 M solution of magnesium derivative of the tetrahydropyranyl ether of 11-bromo-undecanol. 150 ml of this solution were diluted with 50 ml of tetrahydrofuran and after cooling the solution to −30°C, 500 mg of cuprous chloride were added. The solution was maintained with stirring at −25° to −30°C and a solution of 16 g of the acetate of 6-dehydro-19-nor-testosterone in 150 ml of tetrahydrofuran was added over 5 hours. The resulting suspension was stirred for 1 hour at −30°C and 10 ml of acetic acid were added. The mixture was returned to room temperature and water was added. The mixture was decanted and extracted with ethyl ether and the extracts were washed, dried and concentrated to dryness under reduced pressure to obtain 44 g of a resin. The resin was dissolved in 330 ml of methanol and 90 ml of 0.5 N hydrochloric acid were added thereto. Th solution was refluxed for 1¾ hours and was then evaporated to dryness under reduced pressure. The residue was taken up in water and the solution was extracted with methylene chloride and filtered. The filtrate was dried and evaporated to dryness to obtain 34 g of a resin which was purified by chromatography to obtain 24 g of product. The latter was acetylated with 2 volumes of acetic acid anhydride and 2 volumes of pyridine overnight at room temperature followed by the usual treatment and purification to obtain 14.3 g of 17β-acetoxy-7α-(11-acetoxy undecanyl)-$\Delta^4$-estrene-3-one.

| U.V. Spectrum(ethanol) | |
|---|---|
| Max. at 240 nm | $E_{1cm}^{1\%} = 312 \quad \epsilon = 16,500$ |
| Max. at 304 nm | $E_{1cm}^{1\%} = 2$ |

STEP C: 7α-(11-hydroxyundecanyl)-$\Delta^{1,3,5(10)}$-estratriene-3,17β-diol 21.5 g of lead tetraacetate were added under a nitrogen atmosphere to a solution of 14.3 g of the diacetate of Step B in 430 ml of acetic acid and the solution was heated to 110°C for 4 hours and was then distilled to dryness. The residue was taken up in water and the solution was extracted. The extracts were washed, dried and distilled to obtain 16.2 g of a brown resin which was dissolved in 500 ml of acetic acid. 80 g of potassium acetate were added to the solution and the mixture was refluxed overnight. Acetic acid was distilled off and the residue was taken up in water and extracted. The resin was chromatographed to obtain 5.6 g of a product which was saponified by refluxing in 10 volumes of methanol and 1 volume of sodium hydroxide for 5 minutes. Chromatography gave 3.24 g of amorphous 7α-(11-hydroxy undecanyl)-$\Delta^{1,3,5(10)}$-estratriene-3,17β-diol.

U.V. Spectrum (ethanol):

| Inflex. towards 220 nm | $E_{1cm}^{1\%} = 163$ | |
|---|---|---|
| Inflex. towards 230 nm | $E_{1cm}^{1\%} = 114$ | |
| Max. at 280 nm | $E_{1cm}^{1\%} = 52$ | $\epsilon = 2300$ |
| Inflex. towards 287 nm | $E_{1cm}^{1\%} = 46$ | $\epsilon = 2050$ |

STEP D: 3-benzoyloxy-7α-(11-hydroxyundecanyl)-$\Delta^{1,3,5(10)}$-estratriene-17β-ol A mixture of 3.2 g of the product of Step C in 15 ml of N sodium hydroxide and 7 ml of acetone was cooled on an ice bath and 2.3 ml of benzoyl chloride were added dropwise with stirring. The mixture was stirred for 15 minutes and was then diluted with water and extracted. The residue of the organic phase was chromatographed to obtain 2.64 of 3-benzoyloxy-7α-(11-hydroxyundecanyl)-$\Delta^{1,3,5(10)}$-estratriene-17β-ol.

STEP E: 3-benzoyloxy-$\Delta^{1,3,5(10)}$-estratriene-17-one-7α-undecanoic acid

The product of Step D was dissolved in 130 ml of acetone with stirring and after cooling to 5°C, 4.1 ml of an 8 N oxidizing reagent of Heilbron were added over 15 minutes. After another 5 minutes of stirring, methanol was added and the mixture was diluted with water and concentrated under reduced pressure. The mixture was extracted with ethyl acetate and the extracts were washed, dried and concentrated to dryness to obtain 3-benzoyloxy-$\Delta^{1,3,5(10)}$-estratriene-17-one-7α-undecanoic acid.

STEP F: $\Delta^{1,3,5(10)}$-estratriene-3,17β-diol-7α-undecanoic acid 10 ml of 2 N sodium hydroxide were added to a solution of the product of Step E in 50 ml of methanol and after an hour, the solution was cooled on an ice bath. 1.5 g of sodium borohydride were added and the mixture was stirred for 1 hour and acidified to a pH of 1. The mixture was extracted and the extracts were washed, dried and evaporated to dryness. The residue was chromatographed over silica gel to obtain 1.61 g of $\Delta^{1,3,5(10)}$-estratriene-3,17β-diol-7α-undecanoic acid.

U.V. Spectrum (ethanol):

| Inflex. towards 219 nm | $E_{1cm}^{1\%} = 160$ | |
|---|---|---|
| Inflex. towards 229 nm | $E_{1cm}^{1\%} = 115$ | |
| Max. at 280 nm | $E_{1cm}^{1\%} = 46$ | $\epsilon = 2100$ |
| Inflex. towards 286 nm | $E_{1cm}^{1\%} = 42$ | |

EXAMPLE 7

7-carboxymethoxyimino-$\Delta^{1,3,5(10)}$-estratriene-3,17β-diol

A solution of 2 g of $\Delta^{1,3,5(10)}$-estratriene-3,17β-diol-7-one and 2 g of aminoxyacetic acid hemichlorohydrate in 18 ml of N sodium hydroxide was refluxed with stirring under a nitrogen atmosphere for 1 hour and was cooled to 0°C. 9 ml of N hydrochloric acid and 100 ml of water were added thereto and the mixture was extracted with ethyl acetate. The extracts were washed, dried and evaporated to dryness to obtain 2.735 g of product which was chromatographed to obtain 2.44 g of 7-carboxymethoxyimino-$\Delta^{1,3,5(10)}$-estratriene-3,17β-diol.

I.R. Spectrum: C=O at $1727^{cm-1}$ and aromatic at 1618, 1592 and $1506^{cm-1}$.

EXAMPLE 8

7-carboxymethoxyimio-$\Delta^{1,3,5(10)}$-estratriene-3-ol-17-one 0.84 ml of an 8 N chromic anhydride in solution in dilute sulfuric acid (Heilbron Jones Solution) was added dropwise to a mixture of 2.44 g of 7-carboxymethoxyimino-$\Delta^{1,3,5(10)}$-estratriene-3,17β-diol in 122 ml of acetone cooled to 0°C and after stirring at 0°C for 30 minutes, another 0.84 ml of Heilbron Jones solution was added thereto. After 3 hours, another 0.41 ml of Heilbron Jones solution was added and the mixture was stirred for another 30 minutes. 2 ml of methanol and then 10 ml of an aqueous solution saturated with sodium bicarbonate were added dropwise to the mixture which was then vacuum filtered. The filtrate was washed with acetone and concentrated and then 200 ml of ethyl acetate were added. The organic phase was washed, dried and concentrated to dryness to obtain 2.135 g of a resin which was chromatographed to obtain 1.848 g of 7-carboxymethoxyimino-$\Delta^{1,3,5(10)}$-estratriene-3-ol-17-one.

Analysis: $C_{20}H_{23}O_5N$: Calculated: %C 67.21, %H 6.48, %N 3.91; Found: 67.1 6.7 3.6.

EXAMPLE 9

4'-carboxymethyl-2'-semicarbazone of $\Delta^{1,3,5(10)}$-estratriene-3,17β-diol-7-one A mixture of 10.2ml of methanol, 1.8 g of potassium N-carboxyhydrazinoglycinate and 8.9 ml of a methanol solution of 43 mg/ml of hydrochloric acid was formed with stirring under a nitrogen atmosphere and after heating the resulting suspension to reflux, 1.020 g of $\Delta^{1,3,5(10)}$-estratriene-3,17β-diol-7-one was added thereto. After refluxing for 3 hours, the mixture was cooled and vacuum filtered and the precipitate was washed to obtain 2 g of resin. The resin was added to 50 ml of a methylene chloride solution of diazomethane titrating 12.1 g per liter and the mixture was held at 0°C for 1 hour and was vacuum filtered. The filtrate was evaporated to dryness to obtain 1.926 g of resin which was chromatographed to obtain 825 mg of product. The latter was dissolved in 8 cm of ethanol and 3 ml of N sodium hydroxide were added thereto. The reaction mixture stood at room temperature for 20 minutes and was iced and then 3 ml of N hydrochloric acid and 5 ml of water were added. The mixture was vacuum filtered and the crystals were washed and dried to obtain 3.43 mg of 4'-carboxymethyl-2'-semicarbazone of $\Delta^{1,3,5(10)}$-estratriene-3,17β-diol-7-one.

EXAMPLE 10

Triethylamine salt of 7-carboxymethoxyimino-$\Delta^{1,3,5(10)}$-estratriene-3,17β-diol 1 g of aminoxyacetic acid hemichlorohydrate was added to a mixture of 1 g of $\Delta^{1,3,5(10)}$-estratriene-3,17β-diol-7-one (U.S. Pat. No. 2,418,603) in 10 ml of ethanol and the 8 ml of N sodium hydroxide were added to the suspension. The resulting solution stood at room temperature for 3 hours and then 8 ml of N hydrochloric acid were added. The mixture was diluted and extracted with ethyl acetate. The extracts were washed, dried and distilled to dryness to obtain 1.23 g of a resin with an IR Spectrum (ethanol) of C=O at $1748^{cm-1}$ and OH at $3607^{cm-1}$.

0.5 ml of triethylamine and 4 ml of methanol were added to a solution of 1.23 g of the said resin in 10 ml of ethyl acetate and the solution was concentrated by azeotropic entrainment of methanol while adding ethyl acetate for a constant volume. After the methanol was removed, 0.2 ml of triethylamine was added. The mixture was iced and vacuum filtered and the precipitate was washed to obtain 0.990 g of the triethylamine salt of 7-carboxymethoxyimino-$\Delta^{1,3,5(10)}$-estratriene-3,17$\beta$-diol melting at 195°C and having a specific rotation $[\alpha]^{20}_D = +21°$ (c=1% in ethanol).

EXAMPLE A

Conjugation of Beef serum albumin with $\Delta^{1,3,5(10)}$-estratriene-3-ol-17-one-11$\beta$-butyric acid 0.23 ml of tri n-butylamine and 0.063 ml of isobutyl chloroformate were added to a mixture of 178 mg of $\Delta^{1,3,5(10)}$-estratriene-3-ol-17-one-11$\beta$-butyric acid in 5 ml of dioxane cooled to 12°C and the mixture was held at 12°C for 20 minutes. Then, after cooling the solution to 0°C, a solution of 0.770 g of beef serum albumin in 22 ml of water was added thereto and after complete dissolution, 22 ml of dioxane and 0.74 ml of N sodium hydroxide were added at 0°C. The solution stood at 0°C for 4 hours and the mixture was subjected to membrane dialysis for 18 hours. The pH of the resulting solution was adjusted to 4.2 by addition of 2 N hydrochloric acid and the solution was iced for 68 hours at −20°C. The ice was allowed to melt and the product was decanted. The precipitate was dissolved in 50 ml of an iced 1% sodium bicarbonate solution and the solution was subjected to a second membrane dialysis for 48 hours. The resulting solution was extracted with chloroform and the extracted product was subjected to lyophilisation to obtain 720 mg of beef serum albumin conjugated with $\Delta^{1,3,5(10)}$-estratriene-3-ol-17-one-11$\beta$-butyric acid.

| U.V. Spectrum (ethanol): | |
|---|---|
| Inflex. towards 262 nm | $E_{1cm}^{1\%} = 6.6$ |
| Inflex. towards 270 nm | $E_{1cm}^{1\%} = 9$ |
| Max. at 281 nm | $E_{1cm}^{1\%} = 11.8$ |

EXAMPLE B

Using the procedure of Example A, the mixed anhydride of isobutyl chloroformate and $\Delta^{1,3,5(10)}$-estratriene-3,17$\beta$-diol-11$\beta$-butyric acid was reacted to form beef serum albumin conjugated with $\Delta^{1,3,5(10)}$-estratriene-3,17$\beta$-diol-11$\beta$-butyric acid.

| U.V. Spectrum (ethanol): | |
|---|---|
| Inflex. towards 270 nm | $E_{1cm}^{1\%} = 8$ |
| Max. at 279 nm | $E_{1cm}^{1\%} = 11$ |

Various modifications of the products and processes of the invention may be made without departing from the spirit or scope thereof and it is to be understood that the invention is intended to be limited only as defined in the appended claims.

We claim:
1. A steroid of the formula

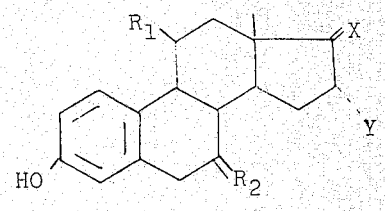

wherein X is selected from the group consisting of =O and

Y is selected from the group consisting of hydrogen and —OH and when $R_1$ is —$(CH_2)_a$—COOH in which a is equal to $2n + 3$ and n is 0, 1 or 2, $R_2$ is

and when $R_1$ is hydrogen, $R_2$ is selected from the group consisting of

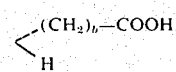

and =N—Z—$(CH_2)_c$—COOH, b is a number from 3 to 18, c is a number from 1 to 8 and Z is selected from the group consisting of —O— and —NHCONH—.

2. A compound of claim 1 wherein $R_1$ is —$(CH_2)_a$—COOH, $a = 2n + 3$, n is 0, 1 or 2 and $R_2$ is

3. A compound of claim 2 selected from the group consisting of $\Delta^{1,3,5(10)}$-estratriene-3,17$\beta$-diol-11$\beta$-butyric acid and $\Delta^{1,3,5(10)}$-estratriene-3-ol-17-one-11$\beta$-butyric acid.

4. A compound of claim 1 in which $R_1$ is hydrogen and $R_2$ is

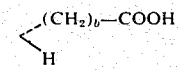

and b is 3 to 18.

5. A compound of claim 4 selected from the group consisting of $\Delta^{1,3,5(10)}$-estratriene-3,17$\beta$-diol-7$\alpha$-butyric acid, $\Delta^{1,3,5(10)}$-estratriene-3-ol-17-one-7$\alpha$-butyric acid, $\Delta^{1,3,5(10)}$-estratriene-3,16$\alpha$,17$\beta$-triol-7$\alpha$-butyric acid and $\Delta^{1,3,5(10)}$-estratriene-3,17$\beta$-diol-7$\alpha$-undecanoic acid.

6. A compound of claim 1 wherein $R_1$ is hydrogen and $R_2$ is =NZ$(CH_2)_c$—COOH.

7. A compound of claim 6 which is selected from the group consisting of 7-carboxymethoxyimino-Δ$^{1,3,5(10)}$-estratriene-3,17β-diol, 7-carboxymethoxyimino-Δ$^{1,3,5(10)}$-estratriene-3-ol-17-one and 4'-carboxymethyl-2'-semicarbazone of Δ$^{1,3,5(10)}$-estratriene-3,17β-diol-7-one.

8. A process for the preparation of a compound of claim 2 comprising reacting a compound of the formula

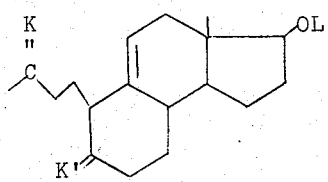

wherein K and K' are blocked keto in the form of a ketal and L is acyl of an organic carboxylic acid with an epoxidation agent followed by reaction with a saponification agent to form a compound of the formula

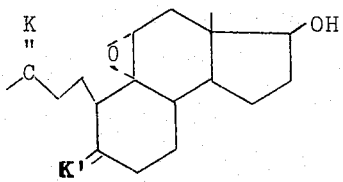

reacting the latter with an allyl magnesium halide to form a compound of the formula

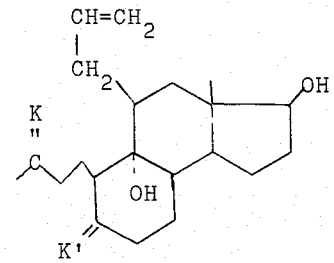

reacting the latter with a deketalization agent and then a cyclization agent to obtain a compound of the formula

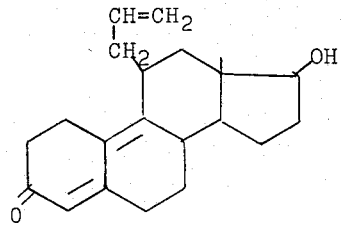

reacting the latter with an aromatization agent to form a compound of the formula

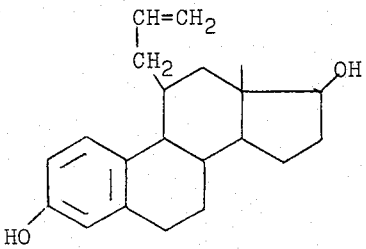

reacting the latter with an acylating agent to form a compound of the formula

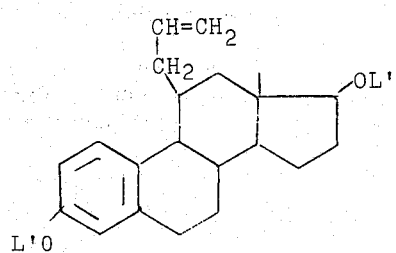

wherein L' is an acyl of an organic carboxylic acid, subjecting the latter to ozonolysis to form a compound of the formula

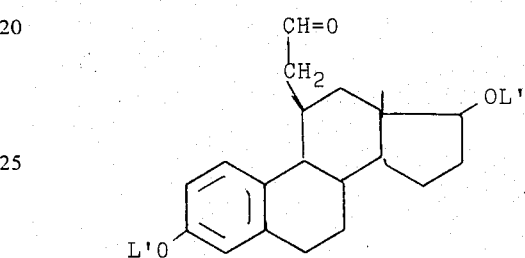

reacting the latter with an alkyl dialkylphosphonoacylate of the formula

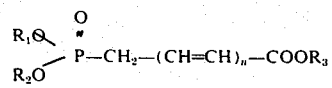

wherein $R_1$, $R_2$ and $R_3$ are the same or different alkyls of 1 to 8 carbon atoms and n has the above definition followed by reaction with a saponification agent to obtain a compound of the formula

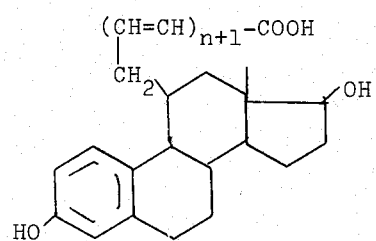

and reacting the latter with a hydrogenation agent to obtain the compound of claim 2.

9. A process for the preparation of a compound of claim 4 comprising reacting a steroid of the formula

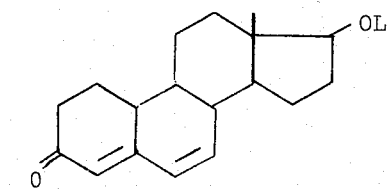

wherein L is acyl of an organic carboxylic acid with a compound of the formula

Hal—Mg—(CH₂)_b—CH₂OM wherein Hal is bromine or chlorine and OM is a blocked hydroxy in ether form followed by reaction with an acid agent and then an acid of the formula AcOH where Ac is acyl of an organic carboxylic acid or a functional derivative thereof to obtain a compound of the formula

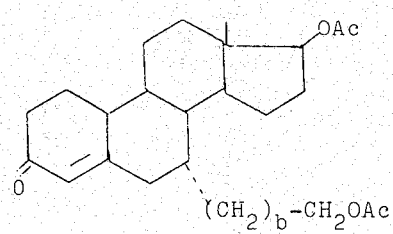

reacting the latter with a saponification agent to obtain a compound of the formula

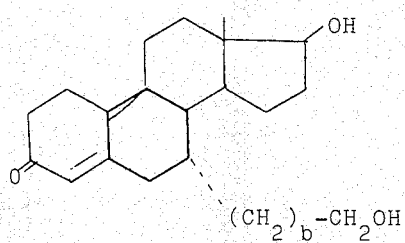

reacting the latter with an oxidation agent to form a compound of the formula

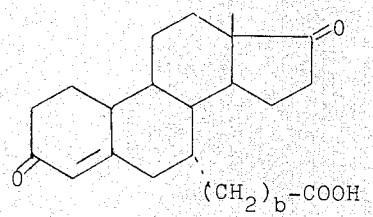

and reacting the latter with a dehydrogenation agent to form a compound of the formula

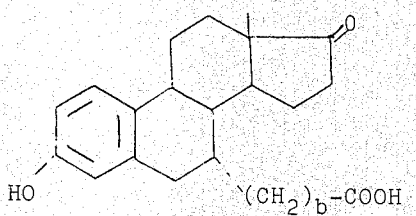

* * * * *